Patented Nov. 3, 1936

2,059,462

UNITED STATES PATENT OFFICE 2,059,462

HEXAMETHYLENETETRAMINE COMPOUND AND THE PROCESS OF PRODUCING THE SAME

Heinrich Jungmann, Altona-Othmarschen, Germany, assignor to Kali-Chemie Aktiengesellschaft, Berlin, Germany, a corporation of Germany No Drawing. Application October 3, 1935, Serial No. 43,327. In Germany October 15, 1934

3 Claims. (Cl. 260—141)

My invention relates to a therapeutically effective hexamethylenetetramine compound and to the process of producing the same.

Stated in more specific terms, the invention relates to a weakly alkaline organic thiocyanogen compound having the antiseptic action of the organic base used in its production, the mucus dissolving properties of the thiocyanates and the pain allaying properties of the calcium salts. The compound is stable in the sense of not being deliquescent and in consequence of its weakly alkaline reaction in water it corresponds to the alkalinity of the body fluid. For these several reasons, the compound of my invention is a mildly acting medium which is particularly adapted for therapeutic purposes.

To produce the compound of my invention, I combine hexamethylenetetramine or its components, ammonia and formaldehyde, with calcium thiocyanate in the presence of a solvent. Out of the aqueous solution of the reaction components, at proper concentration, the compound $Ca(SCN)_2 \cdot (C_6H_{12}N_4)_2 \cdot 4H_2O$ separates in the form of large, strongly light refracting, colorless needles or pieces. The compound in the form of crystal flour, insoluble in alcohol and free of the water of crystallization, may be recovered from the alcoholic solutions of the components. At temperatures above about 80° C. the compound decomposes into formaldehyde and ammonia or N ethylene.

It is well known that thiocyanates have a mucus and pus dissolving action and it has heretofore been proposed to use thiocyanate solutions containing free alkali as therapeutically active media. The compound of the present invention comprising hexamethylenetetramine with calcium thiocyanate has the advantages over these media that, as distinguished from inorganic thiocyanates and alkalies, it is not hygroscopic, so that it can be stored in solid form without deliquescing and, because of its very weakly alkaline properties, its action is very mild.

The thiocyanogen compound of my invention may be used either alone or as a substitute for the inorganic thiocyanates in the usual production of disinfectants which consist of mixtures of thiocyanates with antiseptic or disinfectant media. Dependent on whether the substances used have an alkaline, neutral or acid reaction, the effect of the compound as a whole may be placed in the field of a more alkaline or neutral or acid thiocyanogen compound.

The following examples will serve to illustrate, without limiting, the present invention:

Example I

A saturated aqueous solution of 280 g. of hexamethylenetetramine (=2 mols) is introduced into a saturated solution of 156 g. of calcium thiocyanate, whereupon the greater part of the compound $Ca(SCN)_2 \cdot (C_6H_{12}N_4)_2 \cdot 4H_2O$ immediately precipitates. The compound is drawn off, washed with alcohol and dried with ether in a suction filter. The residue may be recovered out of the filtrate by evaporation in vacuo or at ordinary pressures not above 80° C. or by precipitation with alcohol. As an alternative, I may introduce fresh quantities of the reaction components into the mother liquor and, without evaporation, cause further quantities of the double salt to separate out.

Example II

To an alcoholic solution of 28 g. of hexamethylenetetramine (=⅕ mols) add 15.6 g. of calcium thiocyanate (=1/10 mols) either in solid form or in alcoholic solution, whereupon the double compound immediately precipitates quantitatively.

Example III

Into 300 ccm. of 35% formaldehyde solution introduce 68 g. of a 67% calcium thiocyanate. The introduction of the ammonia is continued, with cooling, until the solution presents an alkaline reaction to phenolphthalein. The solution is then allowed to stand in the cold for several hours, for example 48 hours, and after evaporation in vacuo the double salt crystallizes out.

I claim:

1. A compound consisting of calcium thiocyanate and a substance selected from the class consisting of hexamethylene tetramine and ammonia-formaldehyde.

2. A therapeutically effective compound having the formula $Ca(SCN)_2 \cdot (C_6H_{12}N_4)_2 \cdot 4H_2O$.

3. The herein described process of producing a therapeutic compound, which process comprises reacting calcium thiocyanate with a substance selected from the class consisting of hexamethylenetetramine and ammonia-formaldehyde in the presence of an inert solvent.

HEINRICH JUNGMANN.